United States Patent [19]

Komoda

[11] Patent Number: 4,554,900

[45] Date of Patent: Nov. 26, 1985

[54] METHOD FOR CONTROLLING IGNITION TIMING OF AN INTERNAL COMBUSTION ENGINE

[75] Inventor: Takao Komoda, Okazaki, Japan

[73] Assignee: Toyota Jidosha Kogyo Kabushiki Kaisha, Toyota, Japan

[21] Appl. No.: 640,220

[22] Filed: Aug. 13, 1984

Related U.S. Application Data

[63] Continuation of Ser. No. 361,788, Mar. 25, 1982, abandoned.

[30] Foreign Application Priority Data

Nov. 20, 1981 [JP] Japan ................... 56-186328

[51] Int. Cl.⁴ .............................................. F02P 5/08
[52] U.S. Cl. .................................... 123/418; 123/416; 123/423
[58] Field of Search ............... 123/329, 409, 415, 416, 123/417, 418, 423

[56] References Cited

U.S. PATENT DOCUMENTS

| | | | |
|---|---|---|---|
| 3,911,880 | 10/1975 | Gropp | 123/409 |
| 3,978,833 | 9/1976 | Crall et al. | 123/415 |
| 4,257,363 | 3/1981 | Zeller | 123/423 |
| 4,377,996 | 3/1983 | Yamaguchi | 123/416 |
| 4,389,989 | 6/1983 | Hartig | 123/418 |
| 4,437,442 | 3/1984 | Yamaguchi | 123/423 |

FOREIGN PATENT DOCUMENTS 2069603  8/1981  United Kingdom ............... 123/423

Primary Examiner—Parshotam S. Lall
Assistant Examiner—W. R. Wolfe
Attorney, Agent, or Firm—Finnegan, Henderson, Farabow, Garrett & Dunner

[57] ABSTRACT

A method for controlling ignition timing of an internal combustion engine using an electronic ignition timing control apparatus includes the steps of:

(i) setting ignition timing when the engine is under load to a value determined by the amount of intake air flow and the rotational speed of the engine;

(ii) setting ignition timing when the engine is at idle to a value retarded with respect to the value when the engine is under load, regardless of the amount of intake air flow; and (iii) setting ignition timing during a transition from loaded operation to idling operation to the idle value after a predetermined delay time has elapsed since the start of idling operation.

13 Claims, 6 Drawing Figures

METHOD FOR CONTROLLING IGNITION TIMING OF AN INTERNAL COMBUSTION ENGINE

This application is a continuation of application Ser. No. 361,788, filed Mar. 25, 1982, now abandoned.

BACKGROUND OF THE INVENTION

The present invention relates to a method for controlling ignition timing of an internal combustion engine which uses an electronic ignition timing control apparatus.

In a conventional electronic ignition timing control apparatus, the ignition timing when the engine is under load is set to an optimum value in accordance with the amount of intake air flow and the rotational speed of the engine, and the ignition timing during idling operation is set to a value which is retarded with respect to the timing under load, irrespective of the amount of intake air flow, in order to assure the stability of the engine. FIG. 1 shows a flow chart for an ignition timing control method in the conventional apparatus.

Referring to FIG. 1, (i) Temperature of engine coolant is read in (step I).

(ii) Based on the temperature of the engine coolant, it is determined whether the engine is in a start condition or not (step II).

(iii) When the engine is in the start condition, an advance angle $\theta$ of the engine set to a predetermined start advance angle $\theta$sta (step III).

(iv) When the engine is not in the start condition, it is determined whether an idle switch is on or not (step IV).

(v) When the idle switch is on, that is, when the engine is in idling operation, a base advance angle $\theta_1$ which is a base for setting the advance angle is set to a predetermined idling advance angle $\theta$idl (step V).

(vi) When the idle switch is off, that is, when the engine is under load the amount of intake air flow Q is first read in (step VI).

(vii) After step VI, the engine rotational speed (rpm) N is read in (step VII).

(viii) Based on a prestored data, the base advance angle $\theta_1$ is determined from the amount of intake air flow Q and the engine rotational speed N (step VIII).

(ix) Based on a prestored data, a warm-up correction advance angle $\theta_2$ is determined from the engine coolant temperature (step IX).

(x) The engine advance angle $\theta$ is calculated by adding the base advance angle to the warm-up correction advance angle $\theta_2$ (step X).

(xi) Based on a prestored data, a lower limit $\theta$min allowable to the advance angle $\theta$ is determined from the engine rotational speed N (step XI).

(xii) The advance angle $\theta$ is compared with the lower limit $\theta$min, and if $\theta$min$\leq\theta$, the advance angle $\theta$ is outputted as the advance angle 1 (step XII).

(xiii) If $\theta$min$>\theta$, $\theta$min is selected as the advance angle $\theta$ (step XIII).

In the above conventional ignition timing control method, at the transition from the loaded operation to the idling operation, the amount of intake air flow Q suddenly decreases and hence the advance angle $\theta$ is suddenly retarded. As a result, torque generated by the engine rapidly decreases, resulting in vibration and noise due to backlash of gears of a transmission, which causes degradation of drivability and uncomfortable feeling to a driver.

SUMMARY OF THE INVENTION

It is an object of the present invention to provide a method for controlling ignition timing which can prevent abrupt reduction of the torque generated by the engine at the transition from the loaded operation to the idling operation.

In accordance with the method for controlling ignition timing of the present invention, at the transition from the loaded operation to the idling operation, the ignition timing is set to a timing value of the idling operation after a predetermined time period has passed following the start of the idling operation so that the abrupt reduction of engine torque is prevented.

DETAILED DESCRIPTION OF PREFERRED EMBODIMENT

One embodiment of the ignition timing control method of the present invention is now explained with reference to the drawings.

Figure 1:
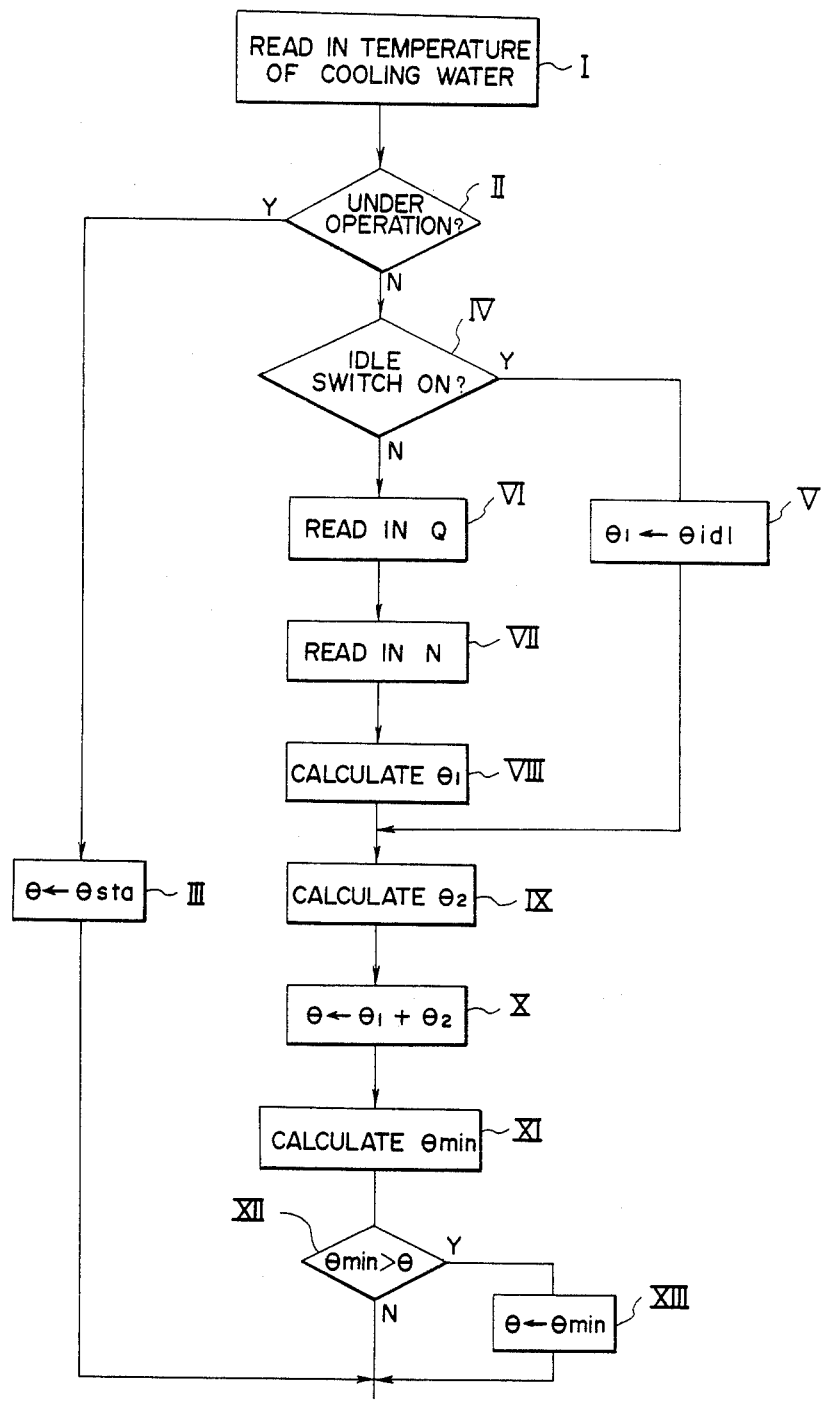
FIG. 1 shows a flow chart illustrating a conventional ignition timing control method.
Figure 2:
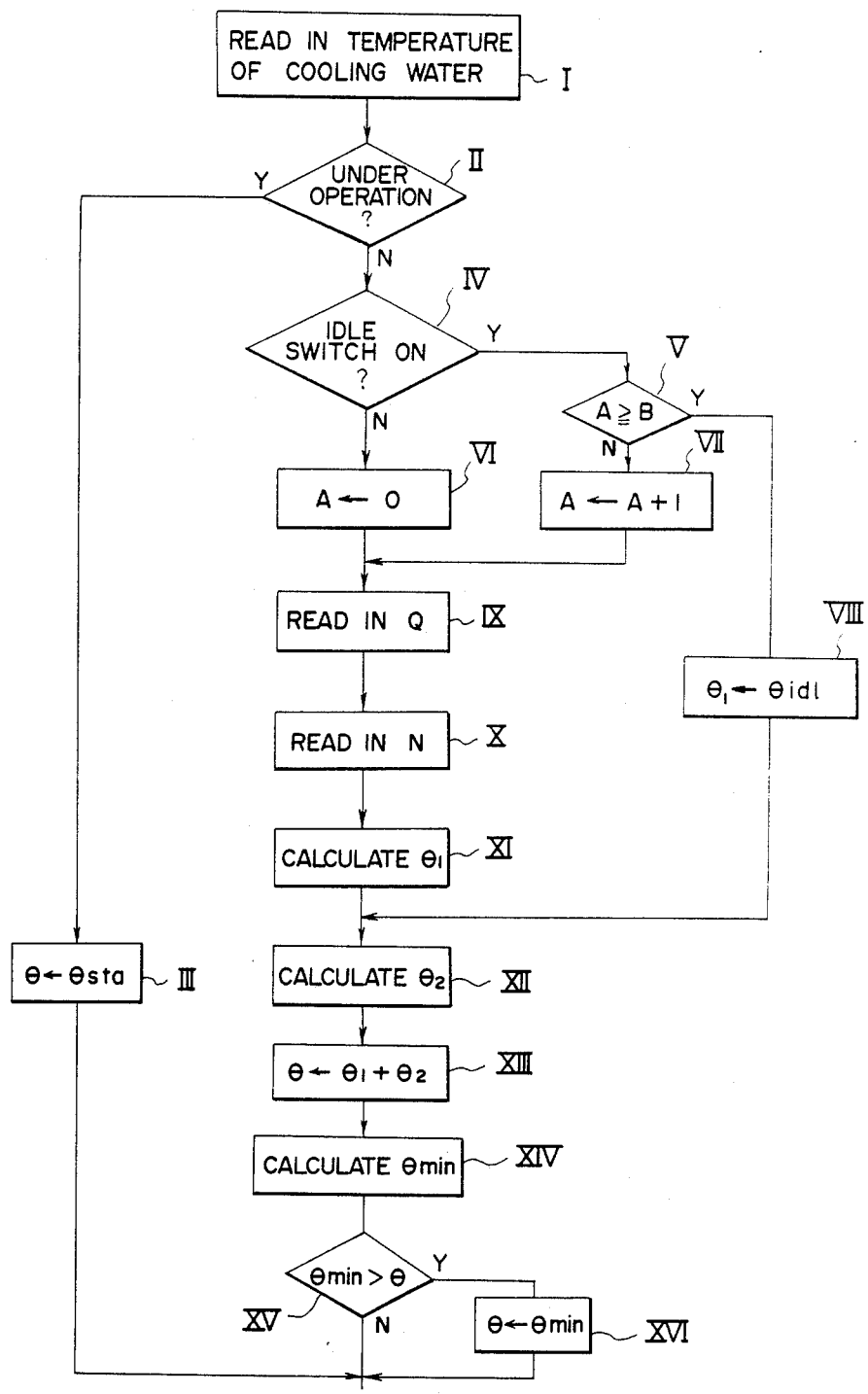
FIG. 2 shows a flow chart illustrating one embodiment of an ignition timing control method of the present invention.

FIG. 2 shows a flow chart illustrating the present embodiment, which will now be explained with reference to the flow chart.

(i) Temperature of engine coolant is read in (step I).

(ii) Based on the temperature of the engine coolant, it is determined whether the engine is in a start condition or not (step II).

(iii) When the engine is in the start condition, an advance angle $\theta$ of the engine is set to a predetermined start advance angle $\theta$sta (step III).

(iv) When the engine is not in the start condition, it is determined if an idle switch is on or not (step IV).

(v) An electronic ignition timing control apparatus has a pulse generator which generates a pulse at a constant interval, and the number of pulses A generated from the pulse generator is counted by a counter. The electronic ignition timing control apparatus stores a pulse count B which corresponds to a predetermined delay time, for example 0.5 second. The pulse count A is compared with the pulse count B (step V).

(vi) When the idling switch is off, the pulse count A is reset to zero (step VI).

(vii) When the idling switch is on and A<B, the pulse count A is incremented by one. In this manner, the pulse generator and the counter are operated (step VII).

(viii) When A$\geq$B, a base advance angle $\theta_1$ is set to a predetermined idling advance angle $\theta$idl (step VIII).

(ix) When the idle switch is off, the amount of intake air flow Q is first read in (step IX).

(x) Next, the rotational speed (rpm) N of the engine is read in (step X).

Figure 4:
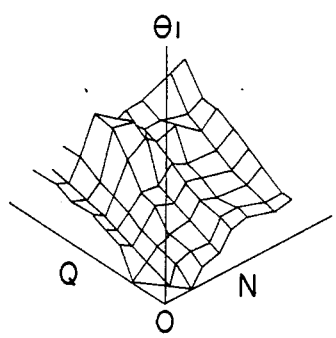
FIG. 4 shows a graph for determining a base advance angle.
Figure 5:
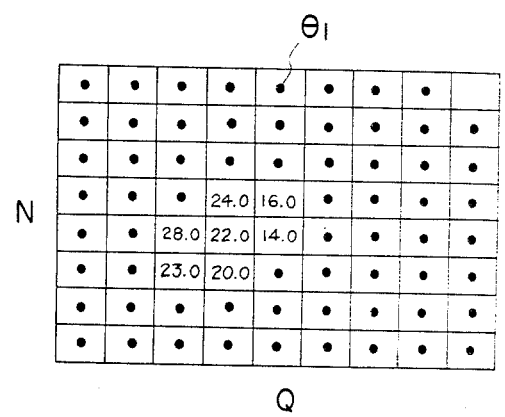
FIG. 5 shows a map for determining the base advance angle.

(xi) The electronic ignition timing control apparatus stores data corresponding to a graph shown in FIG. 4 or a map shown in FIG. 5. From this data, the base advance angle $\theta_1$ is readily determined based on Q and N. In this manner, $\theta_1$ is determined from Q and N (step XI).

(xii) Based on a prestored data, a warm-up correction advance angle $\theta_2$ is determined from the engine coolant temperature (step XII).

(xiii) The engine advance angle $\theta$ is calculated by adding $\theta_1$ to $\theta_2$ (step XIII).

Figure 6:
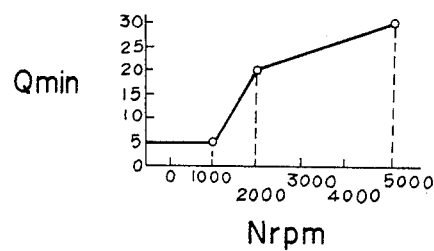
FIG. 6 shows a graph for determining a lower limit allowable to an advance angle.

(xiv) The electronic ignition timing control apparatus stores data corresponding to a graph shown in FIG. 6. From this data, a lower limit $\theta$min allowable to the advance angle $\theta$ can be readily determined based on N. In this manner, $\theta$min is determined from N (step XIV).

(xv) $\theta$ and $\theta$min are compared, and if $\theta$min$\leq\theta$, $\theta$ is outputted as the advance angle (step XV).

(xvi) If $\theta$min$>\theta$, $\theta$min is selected as the advance angle $\theta$ (step XVI).

As is apparent from the step VIII of the present embodiment, the ignition timing is set to that of the loaded operation (that is, the timing value of the engine when under load) until the predetermined time period, e.g. 0.5 seconds, elapses since the start of the idling operation so that the abrupt reduction of engine torque at the transition from the loaded operation to the idling operation is prevented.

In the idling operation immediately after the start of the engine, the ignition timing is also set to the timing value of the loaded operation for a predetermined delay time, but since the delay time is short driving performance is not affected.

Figure 3:
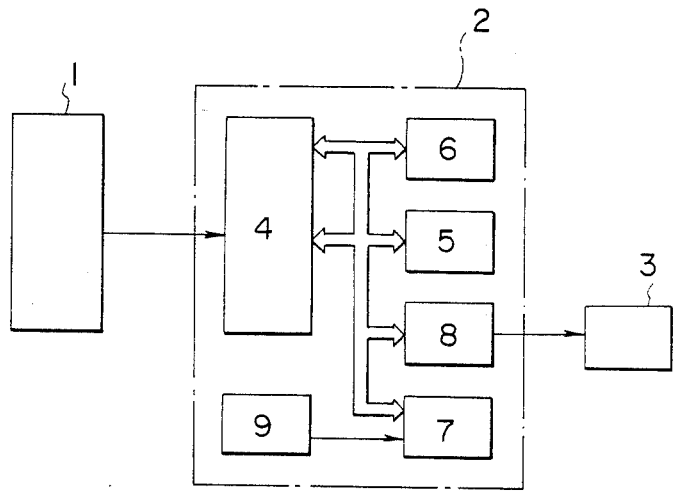
FIG. 3 shows a block diagram of an electronic ignition timing control apparatus used in the embodiment of FIG. 2.

Referring now to FIG. 3, the electronic ignition timing control apparatus used in the present embodiment is explained.

The electronic ignition timing control apparatus comprises a sensor 1, an ECU 2 and an actuator 3. The sensor 1 represents the following elements.

(a) Ignition switch

It is used as a sensor to detect if the engine is in the start condition or not.

(b) Air flow meter

It is used as a sensor to detect the amount of intake air flow Q.

(c) Rotational speed detector

It is used as a detector to detect the rotational speed N of the engine.

(d) Water temperature sensor

It is used as a sensor to detect the temperature of the engine coolant.

(e) Idle switch

It is a sensor to sense if the engine is in the idling operation or not.

The ECU has an interface 4 in which the signal from the sensor is appropriately converted. The signal converted in the interface 4 is applied to a RAM 5 or a CPU 6 for storage or arithmetic operation. The ECU further includes a ROM 7 connected to a constant voltage source 9, which stores the data shown in FIGS. 4, 5 and 6 and the pulse count B corresponding to the delay time. The output from the ECU 2 is supplied to the actuator 3 through an output interface 8.

The actuator 3 has an ignition coil igniter to ignite spark plugs when appropriate.

As described hereinabove, according to the ignition timing control method of the present invention, at the transition from the loaded operation to the idling operation, the ignition timing is set to the timing value of the idling operation after the predetermined time has elapsed since the start of the idling operation. Accordingly, the abrupt reduction of the engine torque at the transition from the loaded operation to the idling operation is prevented.

What is claimed is:

1. A method for controlling ignition timing of an internal combustion engine using an electronic ignition timing control apparatus, comprising the steps of:

setting ignition timing to an appropriate value in a loaded operation in accordance with the amount of intake air flow and the rotational speed of the engine;

setting ignition timing in an idling operation to a idling operation value retarded with respect to the value in the loaded operation irrespective of the amount of intake air flow; and setting ignition timing at a transition from loaded operation to idling operation to said idling operation value after a delay time has elapsed since the start of the idling operation, said transition ignition timing being determined during said delay time in the same manner as when said engine is in a loaded operation.

2. A method for controlling ignition timing of an internal combustion engine using an electronic ignition timing control apparatus, comprising the steps of:

setting ignition timing to an appropriate value in a loaded operation in accordance with the amount of intake air flow and the rotational speed of the engine;

setting ignition timing in an idling operation to an idling operation value retarded with respect to the value in the loaded operation irrespective of the amount of intake air flow; and setting ignition timing at a transition from loaded operation to idling operation to said idling operation value after an invariable delay time has elapsed since the start of the idling operation.

3. A method for controlling ignition timing according to claim 2, wherein the ignition timing during said invariable delay time is determined in the same manner as when said engine is in a loaded operation.

4. A method for controlling ignition timing of an internal combustion engine using an electronic ignition timing control apparatus, comprising the steps of:

setting ignition timing to an appropriate value in a loaded operation in accordance with the amount of intake air flow and the rotational speed of the engine;

setting ignition timing in an idling operation to a value retarded with respect to the value in the loaded operation irrespective of the amount of intake air flow; and setting ignition timing at a transition from loaded operation to idling operation to the idling operation value after a predetermined delay time has elapsed since the start of the idling operation, said transition ignition timing being kept at the loaded operation value during said predetermined delay time.

5. A method for controlling ignition timing according to claim 4 wherein said electronic ignition timing control apparatus comprises a pulse generator for generating pulses at a constant interval and a counter for counting said pulses, said delay time being set in accordance with a count in said counter.

6. A method for controlling ignition timing according to claim 4 wherein said delay time is equal to approximately 0.5 second.

7. A method for controlling ignition timing according to claim 4 wherein a start condition of the engine is determined based on a temperature of engine coolant.

8. A method for controlling ignition timing according to claim 4 wherein an operaton condition of the engine is determined by detecting an open or closed position of an idle switch.

9. A method for controlling ignition timing according to claim 4 wherein a start condition of the engine is determined by detecting an open or closed position of an ignition switch.

10. A method for controlling ignition timing according to claim 4 wherein the amount of air is detected by an air flow meter.

11. A method for controlling ignition timing according to claim 4 wherein the rotational speed of the engine is detected by a rotational speed detector.

12. A method for controlling ignition timing according to claim 4 wherein an ignition coil igniter is used as an actuator.

13. A method for controlling ignition timing according to claim 4 wherein said predetermined delay time is the same for each of said transitions.

* * * * *